United States Patent
Noh

(10) Patent No.: US 9,085,321 B2
(45) Date of Patent: Jul. 21, 2015

(54) UNPARKING CONTROL SYSTEM AND UNPARKING CONTROL METHOD USING THE SAME

(71) Applicant: MANDO CORPORATION, Pyeongtaek-si, Gyeonggi-do (KR)

(72) Inventor: Tae Bong Noh, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/154,807

(22) Filed: Jan. 14, 2014

(65) Prior Publication Data

US 2014/0200769 A1    Jul. 17, 2014

(30) Foreign Application Priority Data

Jan. 17, 2013  (KR) ................ 10-2013-0005496

(51) Int. Cl.
   *B62D 15/02*    (2006.01)
(52) U.S. Cl.
   CPC ................ *B62D 15/0285* (2013.01)
(58) Field of Classification Search
   CPC .. B62D 15/0285; B60W 30/06; B60W 10/06; B60W 10/11; B60W 10/184; B60W 10/20; B60W 50/082
   USPC ..................................... 701/41, 23
   See application file for complete search history.

(56) References Cited

U.S. PATENT DOCUMENTS

| 8,504,245 | B2 * | 8/2013 | Sasajima | 701/41 |
| 8,560,175 | B2 * | 10/2013 | Bammert et al. | 701/41 |
| 8,655,551 | B2 * | 2/2014 | Danz et al. | 701/44 |
| 8,692,687 | B2 * | 4/2014 | Ghisio et al. | 340/932.2 |
| 2013/0110342 | A1 * | 5/2013 | Wuttke et al. | 701/23 |

FOREIGN PATENT DOCUMENTS

| DE | 19933732 A1 * | 1/2001 | ............... B60Q 9/00 |
| DE | 102009057646 | * | 6/2011 |

* cited by examiner

*Primary Examiner* — Mary Cheung
*Assistant Examiner* — Brian P Sweeney
(74) *Attorney, Agent, or Firm* — Lowe Hauptman & Ham, LLP

(57) ABSTRACT

Provided is an unparking control system capable of unparking a vehicle from a parking space safely, conveniently and quickly through a reduced number of unparking control steps, and an unparking control method using the same. The unparking control system includes: a parking control device configured to measure distances from front and rear objects positioned around a vehicle, determine an initial unparking direction and whether to perform steering control according to whether a front distance among the measured distances exceeds a preset reference distance, and generate and provide a steering control signal based on the determined initial unparking direction and whether to perform steering control; and an electronic control steering device configured to adjust a steering angle according to the steering control signal provided by the parking control device.

8 Claims, 5 Drawing Sheets

UNPARKING CONTROL SYSTEM AND UNPARKING CONTROL METHOD USING THE SAME

CROSS-REFERENCE(S) TO RELATED APPLICATION

This application claims the benefit of Korean Patent Application No. 10-2013-0005496, filed on Jan. 17, 2013, in the Korean Intellectual Property Office, the contents of which are incorporated herein by reference in its entirety.

BACKGROUND OF THE INVENTION

1. Field of the Invention

The present invention relates to an unparking control system and an unparking control method using the same, and more particularly, to an unparking control system capable of unparking a vehicle from a parking space safely, conveniently and quickly through a reduced number of unparking control steps, and an unparking control method using the same.

2. Description of the Related Art

Vehicles are everyday necessities in modern times, and a growing number of vehicles coming to markets and running on streets generate various social issues, including traffic congestion and parking problems.

Particularly, the parking problems are so serious that parking spaces are reduced as vehicles are increased in a limited region, city, or nation. The decreasing parking spaces inevitably reduce the size of each parking slot in which one vehicle can be parked.

In the case of a parking space which is not divided into parking slots, a number of vehicles are supposed to be parked at narrow intervals, making it difficult for drivers to park or unpark their vehicles in or from the narrow parking space manually while checking nearby obstacles.

Therefore, a technology has recently been developed and commercialized, which equips a vehicle with an automatic parking assist system so that the system takes pictures of the periphery of the vehicle, checks the pictures, and performs automatic parking.

However, such a conventional automatic parking assist system has the following problem: it initially selects the reverse gear, as the condition of automatic steering entrance, and performs backward control; this means that, when there is a curb opposite the unparking direction, any steering during the backward movement causes a contact between the curb and wheels and a resulting damage; and, if the vehicle is moved backwards straightly (without steering), any contact between the curb and wheels can be avoided, but the number of unparking control steps increases, slowing down the unparking process.

SUMMARY OF THE INVENTION

An aspect of the present invention is directed to an unparking control system capable of unparking a vehicle from a parking space safely, conveniently and quickly through a reduced number of unparking control steps, and an unparking control method using the same.

According to an embodiment of the present invention, an unparking control system includes: a parking control device configured to measure distances from front and rear objects positioned around a vehicle, determine an initial unparking direction and whether to perform steering control according to whether a front distance among the measured distances exceeds a preset reference distance, and generate and provide a steering control signal based on the determined initial unparking direction and whether to perform steering control; and an electronic control steering device configured to adjust a steering angle according to the steering control signal provided by the parking control device.

First to third cables may be installed between the parking control device and the electronic control steering device. A steering request value of the parking control device may be transmitted to the electronic control steering device through the first cable. An SPAS mode value set for operation of forward unparking or backward unparking determined by the parking control device may be transmitted to the electronic control steering device through the second cable. A steering state value of the electronic control steering device may be transmitted to the parking control device through the third cable.

The parking control device may include: a distance measurement unit configured to measure distances from front and rear objects with reference to the vehicle; and an ECU configured to decide whether a distance from the front object, among the distances measured by the distance measurement unit, exceeds the reference distance, provide notification information indicating a gear change in conformity with an initial unparking direction determined as a result of the decision, generate a steering control signal for reaching an unparking target value when the initial unparking direction is forward, and provide the electronic control steering device with the generated steering control signal.

The parking control device may include: a switch provided on the vehicle and used to perform an automatic unparking assist mode; and an output unit configured to output the notification information during operation in the automatic unparking assist mode according to a selection by the switch.

The ECU may include: a reception unit configured to receive distances from front and rear objects measured by the distance measurement unit; a decision unit configured to decide whether the distance from the front object received from the reception unit exceeds the preset reference distance; an unparking direction determination unit configured to determine that the initial unparking direction is forward, when the decision unit decides that the received distance from the front object exceeds the preset reference distance, and set an SPAS mode value for operation of forward unparking; or determine that the initial unparking direction is backward, when the decision unit decides that the received distance from the front object is below the preset reference distance, and set an SPAS mode value for operation of backward unparking; a gear change notification unit configured to output notification information requesting a gear change so that the movement direction of the vehicle is changed to the initial unparking direction determined by the unparking direction determination unit; and a provision unit configured to generate a steering control signal so as to reach an unparking target value of the vehicle in conformity with the initial unparking direction after a gear change is made in response to an output from the gear change notification unit and provide the electronic control steering device with the generated steering control signal.

The provision unit may be configured to generate a steering control signal for reaching the unparking target value when the unparking direction determination unit has determined that the initial unparking direction is forward or generate a steering control signal of "0" for straight movement when the unparking direction determination unit has determined that the initial unparking direction is backward.

The ECU may include a redetermination unit configured to decide whether unparking assist has been completed after backward unparking or forward unparking is performed according to the steering control signal provided by the provision unit and, when unparking assist has not been completed, redetermine an unparking direction and a steering control signal for reaching an unparking target value based on distances between the vehicle in a position after movement and front and rear objects.

According to another embodiment of the present invention, an unparking control system includes: a reception unit configured to receive distances from front and rear objects measured by a distance measurement unit configured to measure distances from front and rear objects with reference to a vehicle; a decision unit configured to decide whether the distance from the front object received from the reception unit exceeds the preset reference distance; an unparking direction determination unit configured to determine that the initial unparking direction is forward, when the decision unit decides that the received distance from the front object exceeds the preset reference distance, and set an SPAS mode value for operation of forward unparking; or determine that the initial unparking direction is backward, when the decision unit decides that the received distance from the front object is below the preset reference distance, and set an SPAS mode value for operation of backward unparking; a gear change notification unit configured to output notification information requesting a gear change so that the movement direction of the vehicle is changed to the initial unparking direction determined by the unparking direction determination unit; and a provision unit configured to generate a steering control signal so as to reach an unparking target value of the vehicle in conformity with the initial unparking direction after a gear change is made in response to an output from the gear change notification unit and provide the electronic control steering device with the generated steering control signal.

According to another embodiment of the present invention, an unparking control method using an unparking control system includes: measuring distances from front and rear objects positioned around a vehicle; determining an initial unparking direction and whether to perform steering control according to whether the distance from the front object, among the measured distances, exceeds a preset reference distance; and generating a steering control signal according to the determined initial unparking direction and whether to perform steering control and providing an electronic control steering device with the generated steering control signal.

The determining may include: receiving the distances from front and rear objects measured during the measuring; deciding whether the received distance from the front object exceeds the preset reference distance; determining that the initial unparking direction is forward, when it is decided during the deciding that the received distance from the front object exceeds the preset reference distance, and setting an SPAS mode value for operation of forward unparking, or determining that the initial unparking direction is backward, when the received distance from the front object is below the preset reference distance, and setting an SPAS value for operation of backward unparking; and outputting notification information requesting a gear change so that the movement direction of the vehicle is changed to the determined initial unparking direction.

During the generating, a steering control signal may be generated so as to reach an unparking target value of the vehicle in conformity with the initial unparking direction after a gear change is made according to the notification information, and the electronic control steering device may be provided with the generated steering control signal.

During the generating, a steering control signal may be generated for reaching the unparking target value, when it is determined during the determining that the initial unparking direction is forward, or a steering control signal of "0" may be generated for straight movement, when it is determined during the determining that the initial unparking direction is backward.

The unparking control method may further include, after the generating: deciding whether unparking assist has been completed after backward unparking or forward unparking is performed according to the steering control signal; and redetermining an unparking direction and a steering control signal for reaching an unparking target value based on distances between the vehicle in a position after movement and front and rear objects when unparking assist has not been completed.

DETAILED DESCRIPTION OF EXEMPLARY EMBODIMENTS

Exemplary embodiments of the present invention will be described below in detail with reference to the accompanying drawings.

Figure 1:
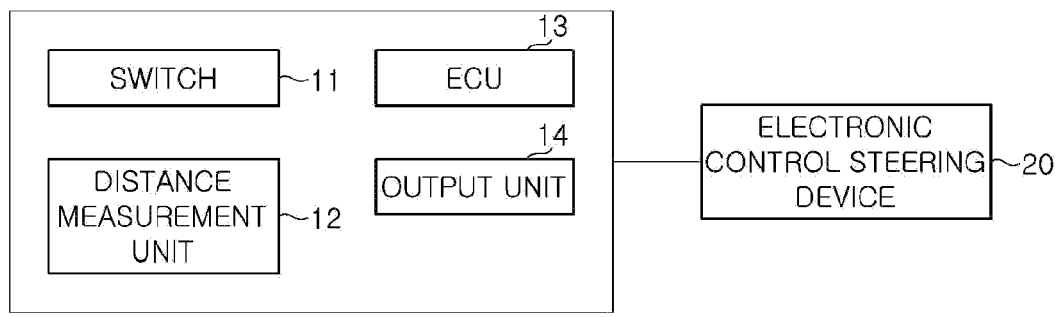
FIG. 1 is a diagram illustrating an unparking control system according to an embodiment of the present invention.
Figure 2:
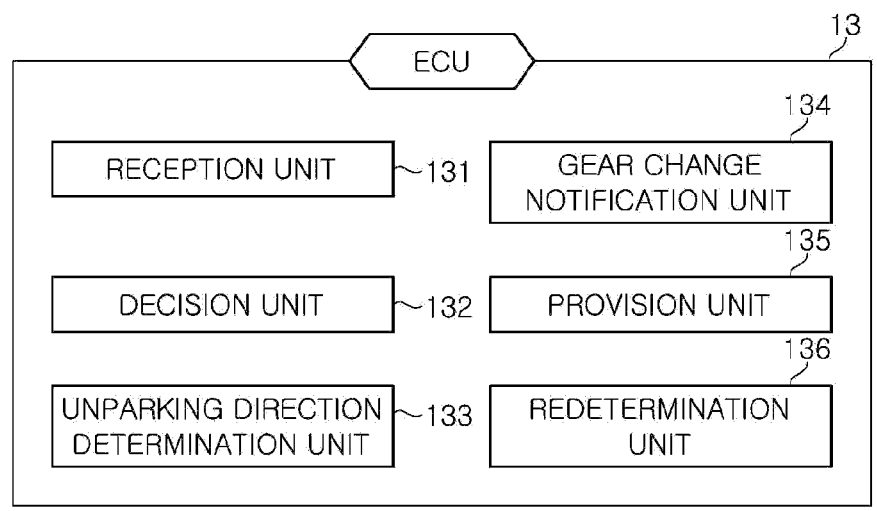
FIG. 2 is a diagram illustrating an ECU of FIG. 1.
Figure 3:
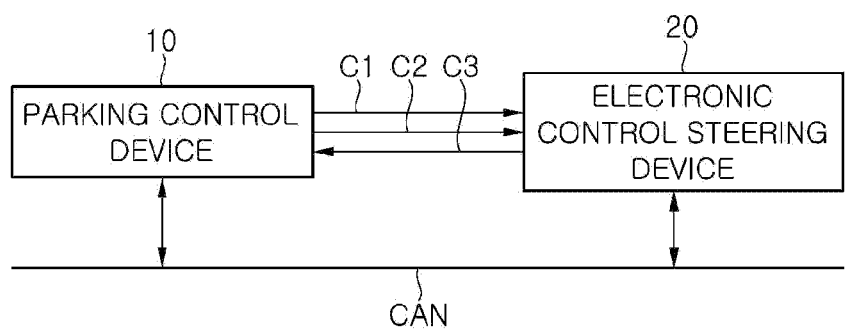
FIG. 3 is a diagram illustrating a state of connection between the parking control device and the electronic control steering device of FIG. 1.

FIG. 1 is a diagram illustrating an unparking control system according to an embodiment of the present invention, FIG. 2 is a diagram illustrating an ECU of FIG. 1, and FIG. 3 is a diagram illustrating a state of connection between the parking control device and the electronic control steering device of FIG. 1.

Referring to FIG. 1, an unparking control system according to an embodiment of the present invention includes a parking control device 10 and an electronic control steering device 20. The parking control device 10 is a Smart Parking Assist System (SPAS). The electronic control steering device 20 is configured to adjust a steering angle according to a steering control signal provided from the parking control device 10.

The parking control device 10 includes a switch 11 configured to switch the operation between an automatic parking assist mode and an automatic unparking assist mode, a distance measurement unit 12 configured to measure distances from objects positioned around the vehicle, an Electronic Control Unit (ECU) 13 configured to compare the distance from a front object, which has been measured by the distance measurement unit 12, with a preset reference distance, determine the unparking direction and whether to perform steering control, and provide the electronic control steering device with a steering control signal based on the determination; and an output unit 14 configured to output notification information generated by control of the ECU 13.

The switch 11 may be installed inside the vehicle or displayed on a terminal (not illustrated) installed inside the vehicle so that the driver can select "unparking mode", "PAS on/off", or "IPAS start/stop". When the driver selects the automatic unparking assist mode (park out mode), the ECU 13 performs unparking control so that the vehicle can be unparked from the parking space quickly. When a steering angle is input as desired by the driver during the automatic unparking assist mode, the ECU 13 switches to a manual unparking mode.

The distance measurement unit 12 is configured to measure distances from front and rear objects with reference to the vehicle within the parking space after the automatic unparking assist mode is selected by the switch 11. The distance measurement unit 12 can be a sensor capable of measuring distances from front and rear objects, for example, an ultrasonic sensor. The size of the parking space may be measured by the distance measurement unit 12.

Furthermore, the distance measurement unit 12 can include at least two side sensors mounted on the sides of the vehicle and at least two front and rear sensors mounted on the front and back of the vehicle. The side sensors and the front and rear sensors are connected to the ECU 13 via an interface, for example, Local Interconnect Network (LIN).

The output unit 14 can be a speaker, a screen of a terminal installed inside the vehicle, or a combination thereof.

Referring to FIG. 2, the ECU 13 includes a reception unit 131, a decision unit 132, an unparking direction determination unit 133, a gear change notification unit 134, a provision unit 135, and a redetermination unit 136.

The reception unit 131 is configured to receive a signal generated when a switch 11 for operation in the automatic unparking assist mode is selected from a plurality of switches 11 installed inside the vehicle. The reception unit 131 is also configured to receive a result of measuring distances between the vehicle and front and rear objects by the distance measurement unit 12.

The decision unit 132 is configured to decide whether the distance from the front object, which has been received by the reception unit 131, exceeds a preset reference distance. The reference distance is a distance that can be measured by the distance measurement unit 12, for example, 30 cm.

When it is decided by the decision unit 132 that the distance from the front object inside the parking space is below the preset reference distance, the unparking direction determination unit 133 determines that the initial unparking direction is backward.

When it is decided by the decision unit 132 that the distance from the front object inside the parking space exceeds the preset reference distance, the unparking direction determination unit 133 determines that the initial unparking direction is forward.

When the initial unparking direction is determined as being backward or forward as a result of the above-mentioned decision of the decision unit 132, the electronic control steering device 20 is provided with an SPAS mode value, which has been set for operation in the determined initial unparking direction.

FIG. 3 is a diagram illustrating a state of connection between the parking control device 10 and the electronic control steering device 20.

Referring to FIG. 3, a plurality of cables C1 to C3 are connected between the parking control device 10 and the electronic control steering device 20. Specifically, the first cable C1 is used to transmit an SPAS steering request value from the parking control device 10 to the electronic control steering device 20. The SPAS steering request value refers to a steering setup value indicating whether automatic steering or manual steering.

The second cable C2 is used to transmit the above-mentioned SAPS mode value from the parking control device 10 to the electronic control steering device 20. The SPAS mode value indicates one of backward parking, forward unparking, and backward unparking; for example, the SPAS mode value can be set in the following manner: "1" indicates backward parking, "3" indicates forward unparking, and "2" indicates backward unparking; and the SPAS mode value is transmitted to the electronic control steering device 20 through the second cable C2. The electronic control steering device 20 recognizes, when the SPAS mode value is "2", that steering control is not performed or recognizes, when the SPAS mode value is "1" or "3", that the steering angle is to be adjusted according to a steering control signal provided by the parking control device 10.

The third cable C3 is used to transmit a steering state value from the electronic control steering device 20 to the parking control device 10. The steering state value indicates whether the electronic control steering device 20 adjusts the steering angle manually or automatically.

The parking control device 10 and the electronic control steering device 20 are also connected by a CAN to be able to communicate with each other. As a result, the parking control device 10 can receive gear position information, vehicle velocity, steering angle, information regarding the position of the vehicle after movement, and the like through the CAN, and the electronic control steering device 20 similarly receives information (for example, steering angle) necessary to adjust the steering angle through the CAN.

When it is determined that the initial unparking direction is backward or forward, the gear change notification unit 134 outputs notification information requesting a gear change in the initial unparking direction determined by the unparking direction determination unit 133, for example, notification information requesting a gear change to a reverse gear or a forward gear, to the output unit 14, for example, a speaker or a screen of a terminal installed inside the vehicle. That is, the gear change notification unit 134 provides notification information indicating a gear change so that the vehicle movement direction is changed to the unparking direction determined by the unparking direction determination unit 133 through a HMI (Human Machine Interface) 15.

As used herein, the initial unparking direction refers to a direction of movement initially tried by the vehicle parked in a parking space.

The provision unit 135 provides, when the initial unparking direction is backward, the electronic control steering device 20 with a steering control signal of "0" or generates, when the unparking direction is forward, a steering control signal so as to reach the unparking target value based on consideration of the distance from the front object received by the reception unit 131 and provides the electronic control steering device 20 with the generated steering control signal.

The redetermination unit 136 then decides whether unparking assist has been completed after the vehicle has been unparked forwards or backwards in the initial unparking direction; when the unparking assist has not been completed, the redetermination unit 136 measures distances between the vehicle in the position after movement and front and rear objects using the distance measurement unit 12 and determines the unparking direction and a steering control signal for reaching the unparking target value. The electronic control steering device 20 is provided with the steering control signal determined in this manner, and the driver can be informed of the unparking direction through the gear change notification unit 134.

The redetermination unit 136 determines the position of the vehicle, which has moved from the initial position, based on information received from at least one of a steering angle sensor installed inside the vehicle, a wheel sensor, a yaw sensor, a gear position measurement sensor, and a G sensor; when unparking assist has not been completed in the determined position, the redetermination unit 136 generates a steering control signal for reaching the unparking target value in the forward or backward unparking direction and provides the electronic control steering device 20 with the generated steering control signal.

An unparking control method using the unparking control system configured as described above will now be described with reference to FIG. 4.

Figure 4:
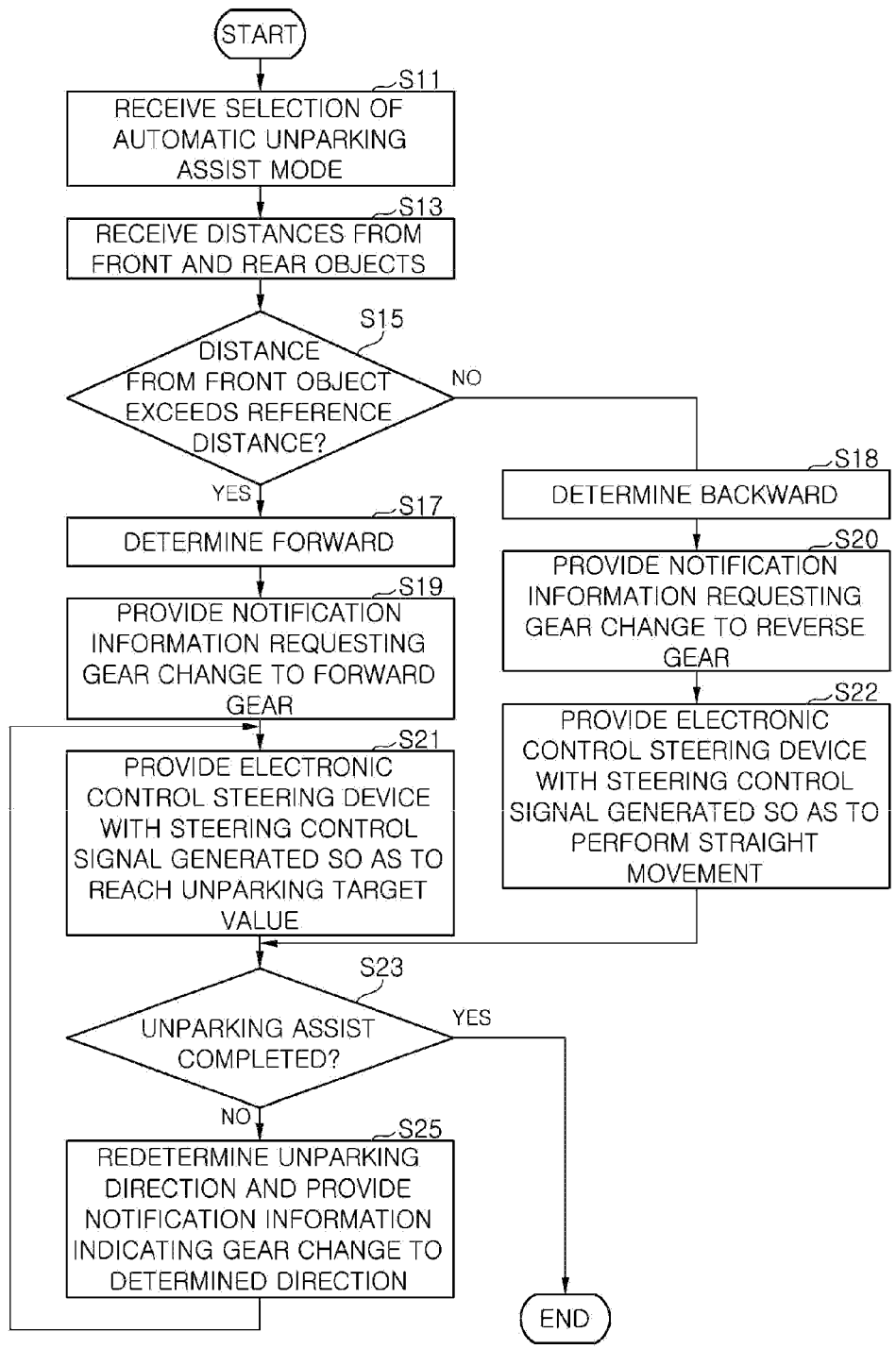
FIG. 4 is an operation flowchart illustrating an unparking control method using an unparking control system according to an embodiment of the present invention.

Referring to FIG. 4, the ECU 13 of the parking control device 10 receives a selection of the automatic unparking assist mode through a switch 11 installed inside the vehicle or a menu displayed on the screen of a terminal installed inside the vehicle (S11).

The ECU 13 receives a measurement result from the distance measurement unit 12, which has measured distances from front and rear objects with reference to the vehicle (S13). The distance measurement unit 12 can include all of sensors for measuring distances from front and rear objects and sensors for measuring distances from side objects.

The ECU 13 receives a result of measurement by the distance measurement unit 12 and decides whether the distance from the front object exceeds a preset reference distance (S15). The reference distance can be a distance that can be measured by the distance measurement unit 12, for example, 30 cm.

When it is decided at step S15 that the distance from the front object exceeds the reference distance, the ECU 13 determines that the initial unparking direction is forward (S17). The ECU 13 provides the electronic control steering device 20 with an SPAS mode value set so that the vehicle is unparked forwards in the determined initial unparking direction.

When it is decided at step S15 that the distance from the front object is below the reference distance, the ECU 13 determines that the initial unparking direction is backward (S18). The ECU 13 provides the electronic control steering device 20 with an SPAS mode value set so that the vehicle is unparked backwards in the determined initial unparking direction.

When it is determined that the initial unparking direction is forward, the ECU 13 provides notification information requesting a gear change to a forward gear (S19). In this case, the ECU 13 can provide notification information when a gear change is necessary based on gear position information from the gear position measurement sensor.

After the above-described step S19, the ECU 13 provides the electronic control steering device 20 with a steering control signal generated so as to reach the unparking target value based on distances from front and rear objects measured by the distance measurement unit 12 (S21).

The ECU 13 then decides whether unparking assist has been completed (S23).

When it is decided at step S23 that unparking assist has not been completed, the ECU 13 redetermines the unparking direction and provides notification information indicating a gear change to the determined direction (S25). The ECU 13 then proceeds to step S21 and provides the electronic control steering device 20 with a steering control signal generated so as to reach the unparking target value, thereby adjusting the steering angle.

Figure 5:
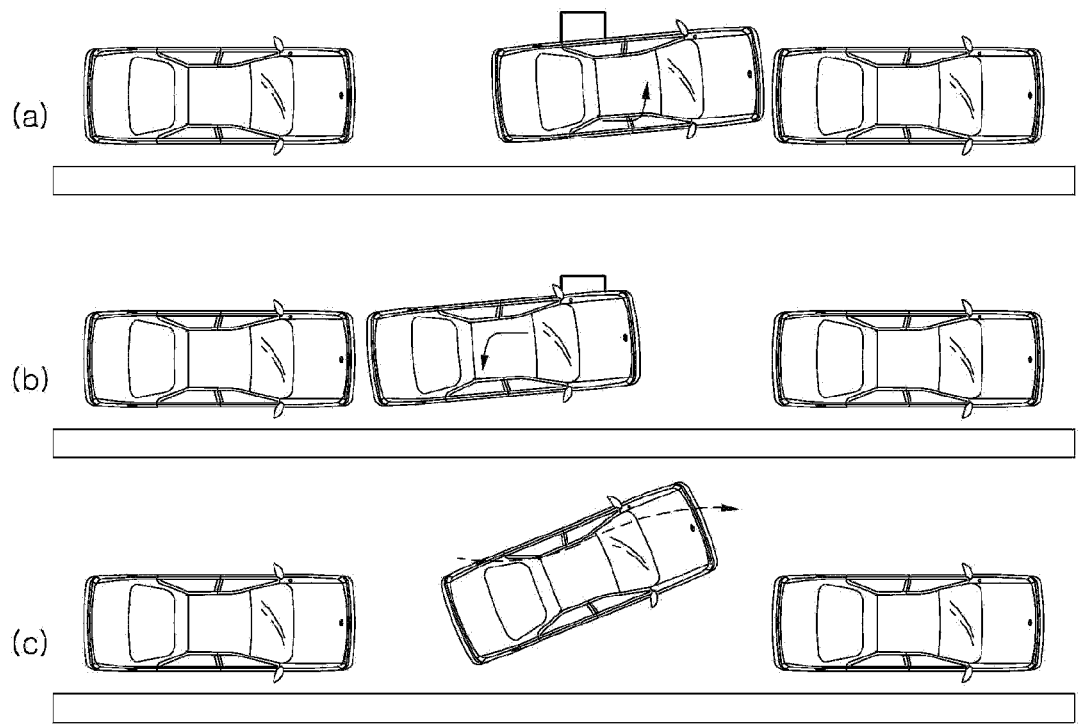
FIGS. 5A to 5C are drawings illustrating a case where an initial unparking direction is forward.

When the vehicle is unparked forwards as illustrated in FIG. 5A, the steering angle is adjusted according to the steering control signal provided to the electronic control steering device 20. In This case, the parking control device 10 transmits an SPAS steering request value, which has been designated as automatic steering, to the electronic control steering device 20.

When unparking is tried through forward steering control, as illustrated in FIG. 5A, but remains uncompleted, the electronic control steering device 20 is provided with a steering control signal generated so as to reach the unparking target value after a change to the reverse gear, and the vehicle is moved as illustrated in FIG. 5B. Such forward unparking reduces the number of unparking control steps.

Then, the steering angle can be adjusted as desired by the driver in the position illustrated in FIG. 5B, so that the vehicle can be unparked from the parking space as illustrated in FIG. 5C. In this case, the parking control device 10 transmits an SPAS steering request value, which has been designated as manual steering, to the electronic control steering device 20.

When it is determined that the initial unparking direction is backward, the ECU 13 provides notification information requesting a gear change to the reverse gear (S20). In this case, the ECU 13 can similarly receive current gear position information and, when the received gear position information indicates a forward gear, provide notification information requesting a change to the reverse gear. If the reverse gear has already been selected, notification information can be provided to indicate that the reverse gear has already been selected.

After the above-described step S20, the ECU 13 provides the electronic control steering device 20 with a steering control signal of "0" so that the vehicle is moved backwards straightly without steering angle control (S22). Then, the ECU 13 proceeds to the above-described step S23 and decides whether unparking assist has been completed.

Figure 6:
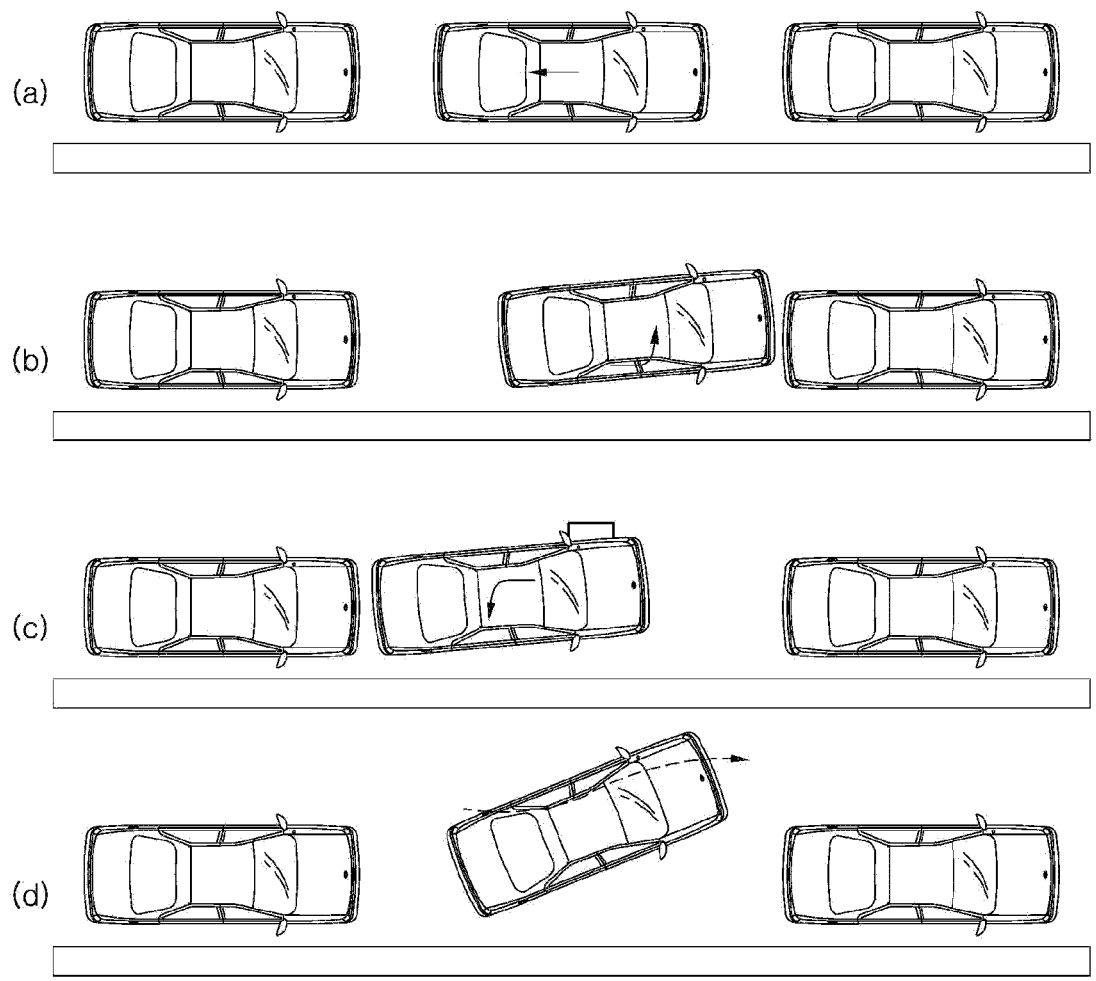
FIGS. 6A to 6D are drawings illustrating a case where an initial unparking direction is backwards.

When the vehicle is unparked backwards as illustrated in FIG. 6A, the vehicle is moved straightly according to the steering control signal "0" provided to the electronic control steering device 20. In this case, the parking control device 10 transmits an SPAS steering request value, which has been designated as automatic steering, to the electronic control steering device 20.

When unparking is tried through backward straight movement as illustrated in FIG. 6A but remains uncompleted, the electronic control steering device 20 is provided with a steering control signal generated so as to reach the unparking target value after a change to a forward gear; the vehicle is moved as illustrated in FIG. 6B; the reverse gear is selected again as illustrated in FIG. 6C; and steering control is performed according to a steering control signal generated so as to reach the unparking target value.

Then, the steering angle can be adjusted as desired by the driver in the position illustrated in FIG. 6C, so that the vehicle can be unparked from the parking space as illustrated in FIG. 6D. In this case, the parking control device 10 transmits an SPAS steering request value, which has been designated as manual steering, to the electronic control steering device 20.

According to an embodiment of the present invention, there is an advantage in that a vehicle can be unparked from a parking space safely, conveniently and quickly through a reduced number of unparking control steps.

According to an embodiment of the present invention, there is another advantage in that the frequency of collision with curbs is reduced, compared with a conventional automatic parking assist system, by generating a steering control signal so as to reach the unparking target value in the case of forward unparking or by generating a steering control signal of "0" in the case of backward unparking.

While the embodiments of the present invention have been described with reference to the specific embodiments, it will

| DESCRIPTION OF REFERENCE NUMERALS | |
|---|---|
| 10: parking control device | 11: switch |
| 12: distance measurement unit | 13: ECU |
| 131: reception unit | 132: decision unit |
| 133: unparking direction determination unit | |
| 134: gear change notification unit | 135: provision unit |
| 136: redetermination unit | 14: output unit |
| 20: electronic control steering device | |

What is claimed is:

1. An unparking control system, comprising:
a distance measurement unit configured to measure a front distance from a front object with reference to a vehicle and a rear distance from a rear object with reference to the vehicle;
an electronic control steering device configured to adjust a steering angle and forward and backward movements of the vehicle; and
an Electronic Control Unit (ECU) configured to decide an initial unparking direction according to the front distance, and control the electronic control steering device to steer the vehicle with the initial unparking direction and the steering angle,
wherein the ECU is configured to decide a forward direction to be the initial unparking direction when the front distance exceeds a preset reference distance, and control the electronic control steering device to steer the vehicle to be unparked by initial movement in the forward direction,
wherein the ECU is configured to decide a backward direction to be the initial unparking direction when the front distance is equal to or below the preset reference distance, and control the electronic control steering device to steer the vehicle to be unparked by initial movement in the backward direction.

2. The unparking control system according to claim 1, further comprising:
a switch provided on the vehicle and configured to select an automatic unparking assist mode; and
an output unit configured to output a notification information which is provided by the ECU during unparking operation in the automatic unparking assist mode according to a selection by the switch.

3. The unparking control system according to claim 2, wherein the ECU comprises:
a reception unit configured to receive the front and rear distances from the distance measurement unit;
a decision unit configured to decide whether the front distance exceeds the preset reference distance;
an unparking direction determination unit configured to determine the initial unparking direction according to the decision of the decision unit, and set an Smart Parking Assist System (SPASM mode value according to the initial unparking direction;
a gear change notification unit configured to provide the notification information including a gear change information so that the initial unparking direction is indicated through the output unit; and
a provision unit configured to generate a steering control signal in order to reach an unparking target value of the vehicle in accordance with the initial unparking direction and provide the electronic control steering device with the steering control signal.

4. The unparking control system according to claim 3, wherein the ECU further comprises a redetermination unit configured to decide a completion of the unparking the vehicle in the initial unparking direction, and redetermine an initial unparking direction according to an updated front distance when the redetermination unit decided that the unparking the vehicle in the initial unparking direction has not been completed.

5. An unparking control method using an unparking control system, the method comprising:
measuring, by a distance measurement unit, a front distance from a front object with reference to a vehicle and a rear distance from a rear object with reference to the vehicle;
determining, by a Electronic Control Unit (ECU), an initial unparking direction according to whether the front distance exceeds a preset reference distance;
generating, by the ECU, a steering control signal according to the determined initial unparking direction; and
performing, by an electronic control steering device, steering control to unpark the vehicle in accordance with the generated steering control signal,
wherein the ECU determines a forward direction to be the initial unparking direction when the front distance exceeds a preset reference distance, and
wherein the ECU determines a backward direction to be the initial unparking direction when the front distance is equal to or below the preset reference distance.

6. The unparking control method according to claim 5, wherein the step of determining comprises;
deciding, by the ECU, whether the front distance exceeds the preset reference distance,
determining, by the ECU, the initial unparking according to the decision,
setting, by the ECU, an Smart Parking Assist System (SPAS) mode value according to the determined initial unparking direction, and
outputting, by a output unit, notification information including a gear change information so that the initial unparking direction is indicated through the output unit.

7. The unparking control method according to claim 6, wherein the steering control signal is generated in order to reach an unparking target value of the vehicle in accordance with the initial unparking direction.

8. The unparking control method according to claim 7, further comprising:
checking, by the ECU, whether the unparking the vehicle in the initial unparking direction is completed; and
redetermining, by the ECU, an initial unparking direction according to an updated front distance when unparking the vehicle in the initial unparking direction has not been completed.

* * * * *